C. P. POND.
POWER HOUSE CONSTRUCTION.
APPLICATION FILED JUNE 1, 1912.

1,114,514.

Patented Oct. 20, 1914.
5 SHEETS—SHEET 1.

C. P. POND.
POWER HOUSE CONSTRUCTION.
APPLICATION FILED JUNE 1, 1912.

1,114,514.

Patented Oct. 20, 1914.
5 SHEETS—SHEET 2.

C. P. POND.
POWER HOUSE CONSTRUCTION.
APPLICATION FILED JUNE 1, 1912.

1,114,514.

Patented Oct. 20, 1914.
5 SHEETS—SHEET 4.

Witnesses—
Walter Chinn
Nills A Burrowes

Inventor—
Clarke P. Pond.
by his Attorneys
Howson & Howson

C. P. POND.
POWER HOUSE CONSTRUCTION.
APPLICATION FILED JUNE 1, 1912.
1,114,514.
Patented Oct. 20, 1914.
5 SHEETS—SHEET 5.
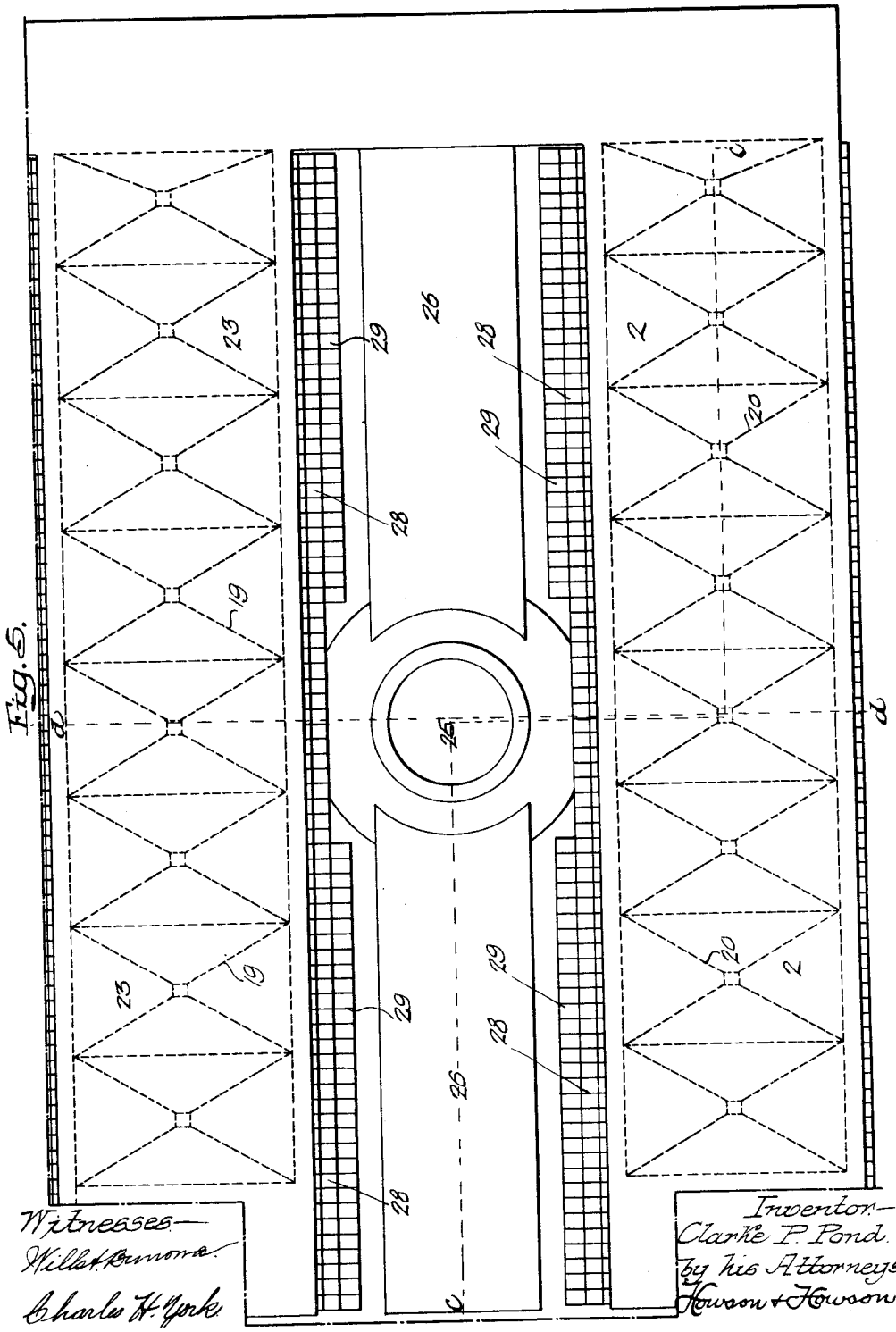

UNITED STATES PATENT OFFICE.

CLARKE P. POND, OF PHILADELPHIA, PENNSYLVANIA.

POWER-HOUSE CONSTRUCTION.

1,114,514.  Specification of Letters Patent.  Patented Oct. 20, 1914.

Application filed June 1, 1912. Serial No. 701,086.

*To all whom it may concern:*

Be it known that I, CLARKE P. POND, a citizen of the United States, residing in Philadelphia, Pennsylvania, have invented certain Improvements in Power-House Construction, of which the following is a specification.

One object of my invention is to provide a novel arrangement and construction of buildings designed to serve as the boiler and engine rooms of a power plant, and having a roof structure which shall permit of the fullest possible lighting and ventilation of said structure consistent with its other requirements.

I further desire to provide such a construction of the roof and upper parts of the boiler room forming part of a power plant, that the duct or conduit connecting each bank of boilers with a stack shall be outside of the building proper, and so arranged as to permit of free entrance of light and air to said building.

Figure 1:
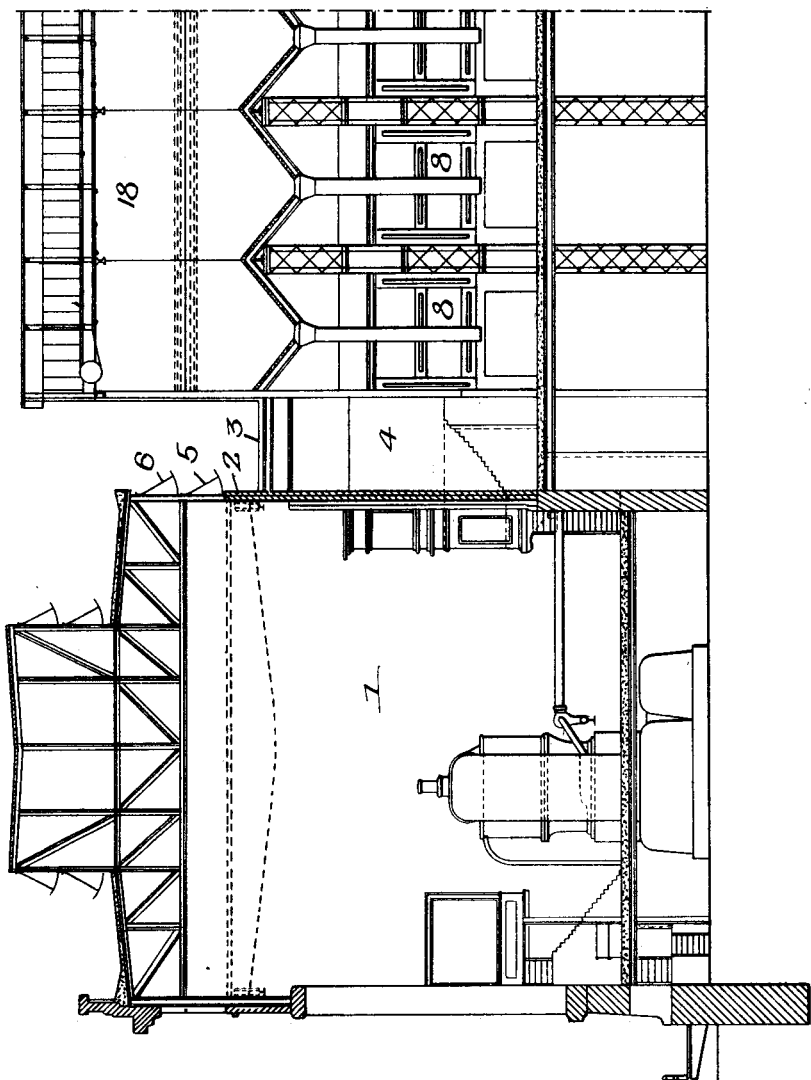
Figure 2:
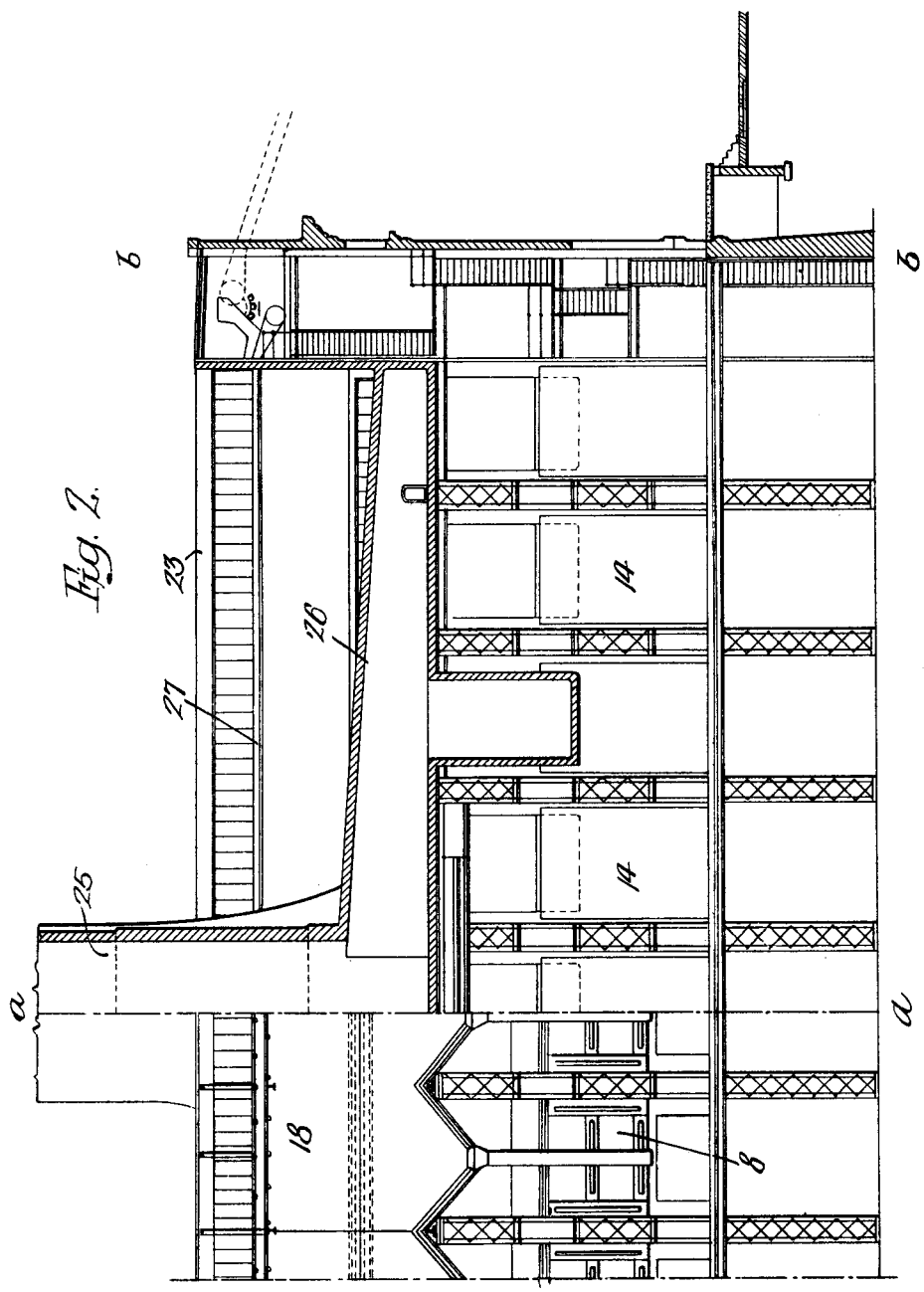
Figure 3:
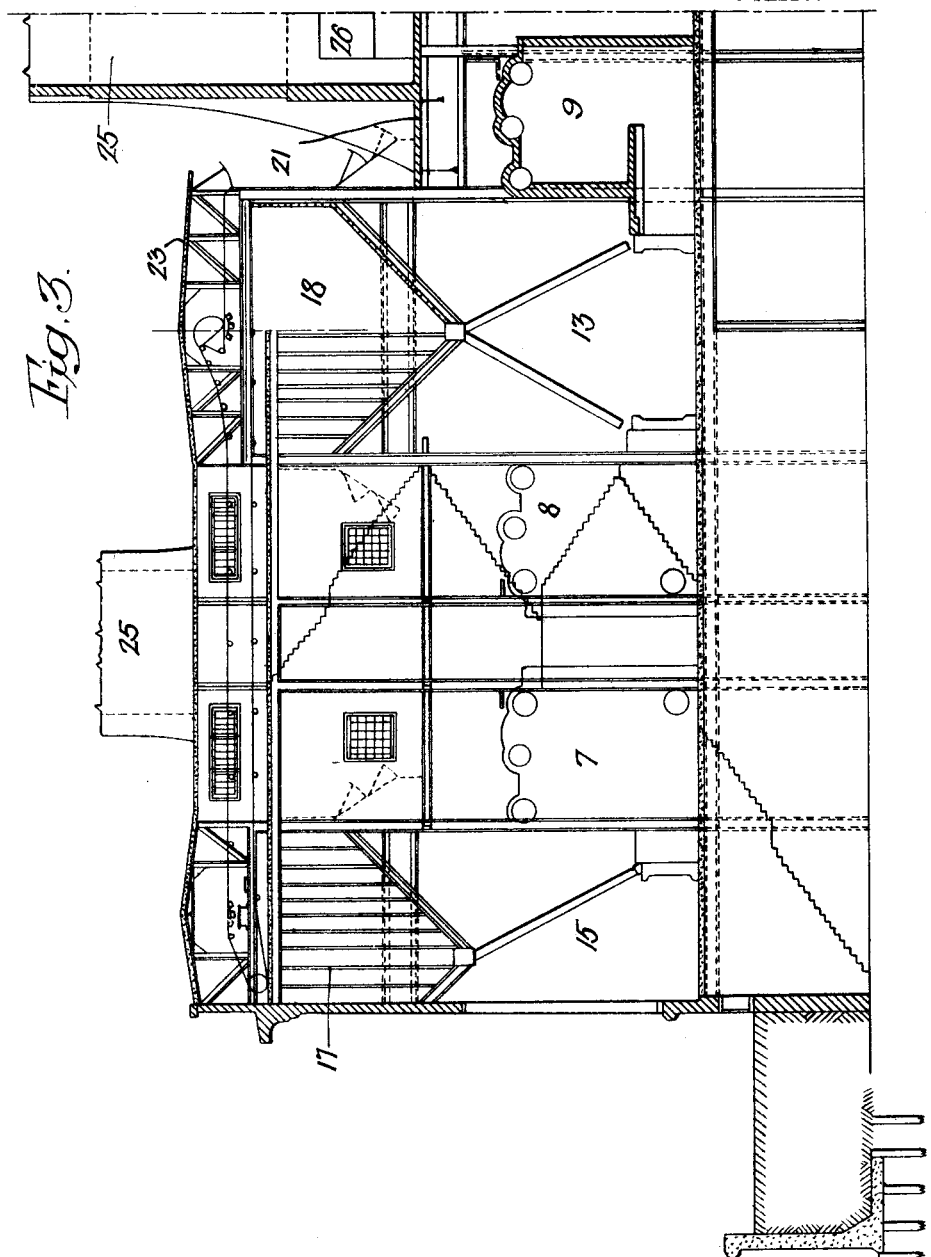
Figure 4:
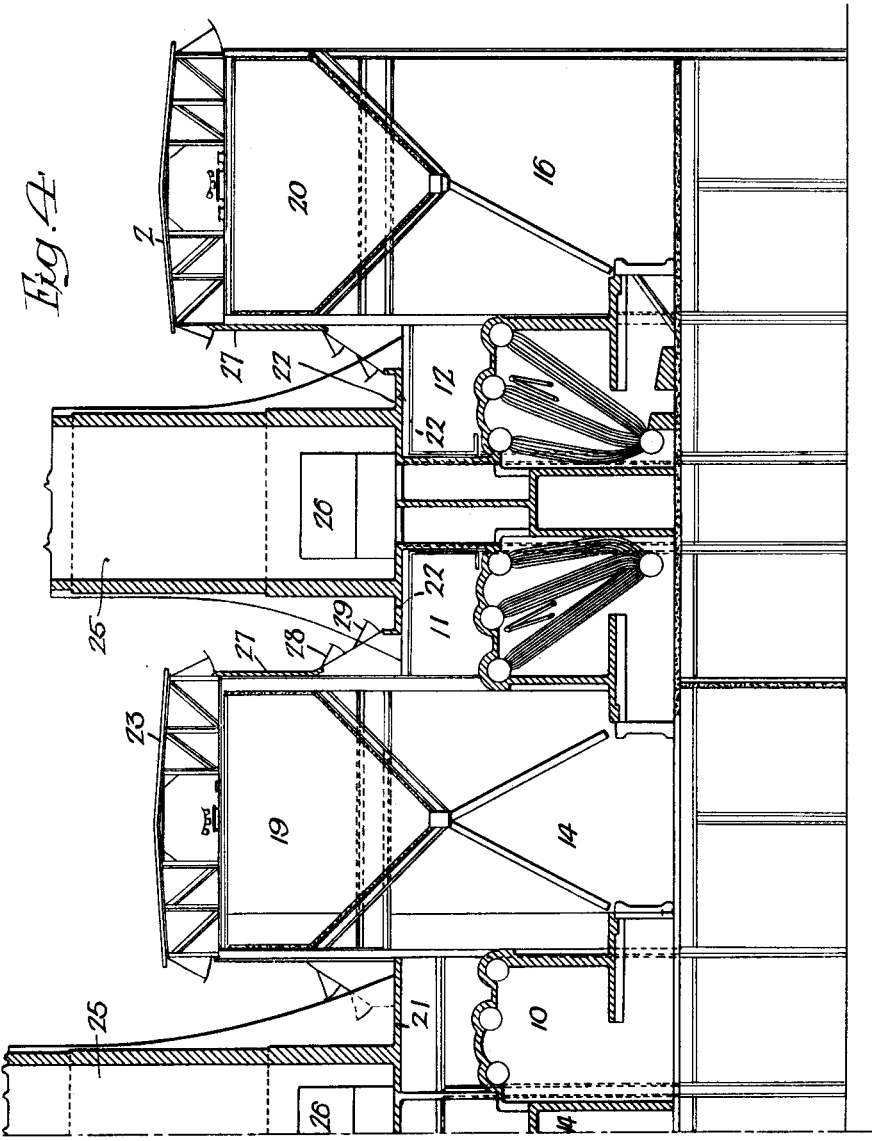

These objects and other advantageous ends I secure as hereinafter set forth, reference being had to the accompanying drawings in which:

Figures 1 and 2, together constitute a vertical section of a power house building constructed according to my invention; a portion of said section in Fig. 2 and all of the section in Fig. 1 being taken through one of the firing alleys of the boiler room, while the remainder of section in Fig. 2 is taken through the stack and the space between the two banks of boilers, Figs. 3 and 4, are vertical sections of the boiler room shown in Figs. 1 and 2; part of Fig. 3 and all of Fig. 4 being taken through the stacks on the line $a$—$a$, Fig. 2, and the remainder of the sections being taken on the line $b$—$b$, Fig. 2, and Fig. 5 is a plan of one section of the power house building illustrated in the foregoing figures of drawing, of which Fig. 2 is taken on the line $c$—$c$ and Fig. 4 is taken on the line $d$—$d$.

In the above drawings, 1 represents the engine room of a power plant, against the side wall 2 of which abuts one end of the boiler room. It is noted, however, that the top roof 3 of that portion of the boiler room 4 immediately adjacent said engine room does not extend to the top of the side wall 2, which therefore is provided with window sashes 5 and 6, whereby light and air are permitted to enter the engine room.

From Figs. 3 and 4 it will be seen that there are a number of banks of boilers in the present instance extending in lines at right angles to the general line of the engine room, and arranged so that those indicated at 8 and 9, and 10 and 11 have firing alleys 13 and 14 respectively between them. Firing alleys 15 and 16 are also provided at the front of the two banks of boilers indicated at 7 and 12. Over each of these firing alleys are placed coal bunkers 17 to 20 inclusive, and it is particularly to be noted that these extend considerably above that part of the building immediately over the various lines or banks of boilers; there being ordinary flat roofs 21 and 22, for example, over the boiler banks 9—10 and 11—12, as well as a similar construction over the two banks 7 and 8, though this latter is not shown in Fig. 3. The upwardly extending lines of bunkers are, therefore, each inclosed by monitors composed of side walls 27 and a roof structure 23, so that there is an elongated depressed passageway between each of the lines of bunkers.

As shown in the section illustrated in Fig. 2, I provide at about the central part of each of these passages, a stack 25 and from its base extend two suitably formed conduits or ducts 26 which lie immediately over the spaces between the banks or lines of boilers and partially over the latter, although being above the roof 22 and therefore wholly outside the building structure. Each boiler of the banks 11 and 12, (Fig. 4), for example, is directly connected to discharge smoke and gases of combustion directly into the conduits 26 immediately above it.

The side walls 27 extending along the bunker structures 17 to 20, inclusive, are preferably each provided with one or more lines of window sashes 28 and 29, which are preferably so supported as to lie in the same plane at an angle of 60° to the horizontal when closed. Light and air are thus freely admitted into the space immediately above each bank of boilers and into the firing alleys adjacent thereto, while the heated air and objectionable gases are freely allowed to escape.

With the above described arrangement and construction of parts, there is little if any of the high temperature constantly found in power houses under operating conditions, for the ducts whereby the products of combustion from the boilers are conveyed to the stack or stacks lie outside of the building in the passages between the line of bunkers.

While the connection between each boiler setting and its adjacent duct is of a minimum length, it is noted that the various lines of bunkers terminate some distance away from the side wall 2 of the engine room so that there is no interference with the passage of light and air to the lines of window sash 5 and 6 of this building.

I claim:—

1. The combination of a building; a line of bunker structures therein; a relatively low roof adjacent the side walls of said bunker structures; a stack; a duct leading to the stack and carried on said roof outside of the building; and boilers under said lower roof receiving fuel from said bunker structures and connected to discharge their products of combustion into said duct, the firing alleys of the boilers being under the bunker structures.

2. The combination of a building, a plurality of lines of bunker structures therein; a relatively low roof between the side walls of said bunker structures forming a passage; a stack; a duct leading to the stack and carried on said roof in the passage outside of the building; with boilers under said low roof structure receiving fuel from said bunker structures and connected to discharge their products of combustion into said duct.

3. The combination of a building; a plurality of lines of bunker structures therein; a relatively low roof structure between the adjacent side walls of said bunker structures forming a passage; windows in the said side walls of bunker structures immediately above the roof opening into the spaces under the bunker structures; a stack; a duct leading to the stack and carried outside the building; with a series of boilers having said spaces under the bunker structures as their firing alleys and connected to discharge their products of combustion into the duct.

4. The combination in a building having two monitors; bunkers in said monitors; a relatively low roof between the monitors; an elongated duct mounted on said roof; a stack connected to said duct; and a series of boilers in the building directly connected to said duct.

5. The combination in a building having monitors; of two bunker structures in the monitors; a depressed roof between the monitors; a stack extending upwardly from said roof; a duct extending above the roof and connected to said stack; and a series of boilers having their firing alleys under the bunker structures and connected to discharge their products of combustion directly into said duct, with windows opening from the space between monitors into the upper parts of the firing alleys.

6. The combination in a building having monitors; of a plurality of bunkers in the monitors; a depressed roof between each adjacent pair of said monitors; a plurality of banks of boilers directly under said roof and designed to be fired from the space under the bunkers; windows between the side walls of the monitors opening into the space under the bunkers; a duct on the roof directly connected to the boilers; and a stack connected to said duct.

In testimony whereof, I have signed my name to this specification, in the presence of two subscribing witnesses.

CLARKE P. POND.

Witnesses:
 WILLIAM E. BRADLEY,
 WM. A. BARR.